(12) United States Patent
Ko et al.

(10) Patent No.: US 11,204,645 B2
(45) Date of Patent: Dec. 21, 2021

(54) METHOD FOR PROVIDING HAPTIC FEEDBACK, AND ELECTRONIC DEVICE FOR PERFORMING SAME

(71) Applicant: SAMSUNG ELECTRONICS CO., LTD., Suwon-si (KR)

(72) Inventors: Seung Hoon Ko, Suwon-si (KR); Dae Hyun Yoo, Hwaseong-si (KR); Heon Seok Lee, Suwon-si (KR); Eun Mi Cha, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/611,710

(22) PCT Filed: May 10, 2018

(86) PCT No.: PCT/KR2018/005360
§ 371 (c)(1),
(2) Date: Nov. 7, 2019

(87) PCT Pub. No.: WO2018/208093
PCT Pub. Date: Nov. 15, 2018

(65) Prior Publication Data
US 2021/0141454 A1   May 13, 2021

(30) Foreign Application Priority Data
May 11, 2017   (KR) .......................  10-2017-0058415

(51) Int. Cl.
*G06F 3/01*   (2006.01)
*G06F 3/041*   (2006.01)
(Continued)

(52) U.S. Cl.
CPC ............ *G06F 3/016* (2013.01); *G06F 3/0346* (2013.01); *G06F 3/0488* (2013.01); *G06F 3/04146* (2019.05)

(58) Field of Classification Search
CPC .... G06F 3/016; G06F 3/04146; G06F 3/0346; G06F 3/0488
See application file for complete search history.

(56) References Cited

U.S. PATENT DOCUMENTS 6,211,861 B1   4/2001   Rosenberg et al.
7,136,045 B2   11/2006   Rosenberg et al.
(Continued)

FOREIGN PATENT DOCUMENTS

EP   2 857 932   4/2015
EP   2 891 969   7/2015
(Continued)

OTHER PUBLICATIONS

Extended Search Report dated Mar. 12, 2020 in counterpart European Patent Application No. 18798430.7 (7 pages).
(Continued)

*Primary Examiner* — Charles V Hicks
(74) *Attorney, Agent, or Firm* — Nixon & Vanderhye, P.C.

(57) ABSTRACT

According to various embodiment of the disclosure, there is disclosed an electronic device that includes a touch sensor that senses a touch, an actuator, a touch controller that generates a touch event based on a touch signal received from the touch sensor, and a haptic controller, wherein the haptic controller receives the touch event generated from the touch controller through direct communication with the touch controller and drives the actuator in response to the
(Continued)

reception of the touch event. In addition, it is possible to implement various embodiment understood through the disclosure.

17 Claims, 12 Drawing Sheets

(51) Int. Cl.
  *G06F 3/0346* (2013.01)
  *G06F 3/0488* (2013.01)

(56) References Cited

U.S. PATENT DOCUMENTS

| | | | |
|---|---|---|---|
| 8,469,806 | B2 | 6/2013 | Grant et al. |
| 8,502,651 | B2 | 8/2013 | Birnbaum |
| 8,935,637 | B2 | 1/2015 | Kim et al. |
| 9,235,969 | B2 | 1/2016 | Grant et al. |
| 9,239,622 | B2 | 1/2016 | Park et al. |
| 9,373,233 | B2 | 6/2016 | Birnbaum |
| 9,465,438 | B2 | 10/2016 | Rosenberg et al. |
| 9,483,120 | B2 | 11/2016 | Park et al. |
| 9,671,866 | B2 | 6/2017 | Grant et al. |
| 9,807,694 | B2 | 10/2017 | Yoon et al. |
| 9,864,504 | B2 | 1/2018 | Park et al. |
| 9,921,655 | B2 | 3/2018 | Birnbaum |
| 10,025,426 | B2 | 7/2018 | Yang et al. |
| 10,095,353 | B2 | 10/2018 | Yang et al. |
| 10,133,393 | B2 | 11/2018 | Yu |
| 10,139,911 | B2 | 11/2018 | Grant et al. |
| 2001/0010513 | A1 | 8/2001 | Rosenberg et al. |
| 2006/0267944 | A1 | 11/2006 | Rosenberg et al. |
| 2011/0018697 | A1 | 1/2011 | Birnbaum |
| 2011/0021272 | A1 | 1/2011 | Grant et al. |
| 2011/0080349 | A1* | 4/2011 | Holbein ............... G06F 1/3203 345/173 |
| 2011/0260990 | A1* | 10/2011 | Ali .......................... G06F 3/016 345/173 |
| 2011/0304648 | A1 | 12/2011 | Kim et al. |
| 2013/0328814 | A1 | 12/2013 | Birnbaum |
| 2014/0009273 | A1 | 1/2014 | Grant et al. |
| 2014/0168124 | A1 | 6/2014 | Park et al. |
| 2016/0132118 | A1 | 5/2016 | Park et al. |
| 2016/0231814 | A1 | 8/2016 | Grant et al. |
| 2016/0266679 | A1* | 9/2016 | Shahparnia ............ G06F 3/044 |
| 2017/0168573 | A1 | 6/2017 | Birnbaum |
| 2017/0256144 | A1* | 9/2017 | Khoshkava ............. G06F 3/016 |
| 2017/0357323 | A1 | 12/2017 | Grant et al. |
| 2018/0253225 | A1* | 9/2018 | Zhang .................. G06F 3/0446 |
| 2019/0073037 | A1 | 3/2019 | Grant et al. |

FOREIGN PATENT DOCUMENTS

| | | |
|---|---|---|
| KR | 20-0258353 | 12/2001 |
| KR | 10-2011-0136587 | 12/2011 |
| KR | 10-2014-0051590 | 5/2014 |
| KR | 10-2015-0068175 | 6/2015 |
| KR | 10-2016-0046401 | 4/2016 |

OTHER PUBLICATIONS

International Search Report for PCT/KR2018/005360 dated Aug. 21, 2018, 13 pages.
Written Opinion of the ISA for PCT/KR2018/005360 dated Aug. 21, 2018, 6 pages.
Notification of Reasons for Refusal dated Jun. 28, 2021 in counterpart Korean Patent Application No. 10-2017-0058415 and English-language translation.

* cited by examiner

US 11,204,645 B2

METHOD FOR PROVIDING HAPTIC FEEDBACK, AND ELECTRONIC DEVICE FOR PERFORMING SAME

This application is the U.S. national phase of International Application No. PCT/KR2018/005360 filed May 10, 2018 which designated the U.S. and claims priority to KR Patent Application No. 10-2017-0058415 filed May 11, 2017, the entire contents of each of which are hereby incorporated by reference.

Technical Field

Embodiments of the disclosure relate to a method of providing haptic feedback in response to a touch of a user and an electronic device performing the same.

Background Art

An electronic device such as a smart phone, a tablet PC, a smart watch, and the like may execute various applications in response to a touch of a user. The electronic device may provide appropriate haptic feedback (e.g., vibration) in response to a touch of a user. The user may confirm whether a touch is made accurately, through haptic feedback and may clearly recognize that the corresponding operation is executed.

SUMMARY

Technical Problem

In providing haptic feedback, an application processor may control operations of a touch controller and a haptic controller. When a touch of a user is input, the application processor may operate in an awake mode and control the haptic controller to provide haptic feedback. When the repetitive touch of a user is input while the application processor operates in the sleep mode to reduce power consumption, the application processor may not be maintained in the sleep mode and may switch into the awake mode. As a result, the repetitive touch of the user may increase the power consumption of the electronic device and may reduce the battery usage time.

In addition, when a user touch is input while the application processor operates in the sleep mode, the application processor may have difficulty in providing haptic feedback immediately after the touch is input because switching of the operation mode must be preceded.

According to an embodiment of the disclosure, an electronic device includes a touch sensor that senses a touch, an actuator, a touch controller that generates a touch event based on a touch signal received from the touch sensor, and a haptic controller, wherein the haptic controller receives the touch event generated from the touch controller through direct communication with the touch controller and drives the actuator in response to the reception of the touch event.

In addition, according to an embodiment of the disclosure, a method of providing a haptic feedback of an electronic device includes sensing a touch, generating, by a touch controller, a touch event based on a touch signal received from a touch sensor, and receiving, by a haptic controller, the touch event generated from the touch controller through direct communication with the touch controller and driving an actuator in response to the reception of the touch event.

According to the embodiments of the disclosure, the electronic device may provide haptic feedback to a user through direct communication between a touch controller and a haptic controller, thereby reducing the number of driving of an application processor and providing fast response speed. The electronic device may provide immediate haptic feedback in response to a user touch even when the application processor is in a sleep mode.

In addition, various effects that are directly or indirectly understood through the disclosure may be provided.

BRIEF DESCRIPTION OF THE DRAWINGS

With regard to description of drawings, the same or similar elements may be marked by the same or similar reference numerals.

DETAILED DESCRIPTION OF EXAMPLE EMBODIMENTS

Hereinafter, various embodiments of the disclosure may be described with reference to accompanying drawings. Accordingly, those of ordinary skill in the art will recognize that modification, equivalent, and/or alternative on the various embodiments described herein can be variously made without departing from the scope and spirit of the disclosure.

Figure 1:
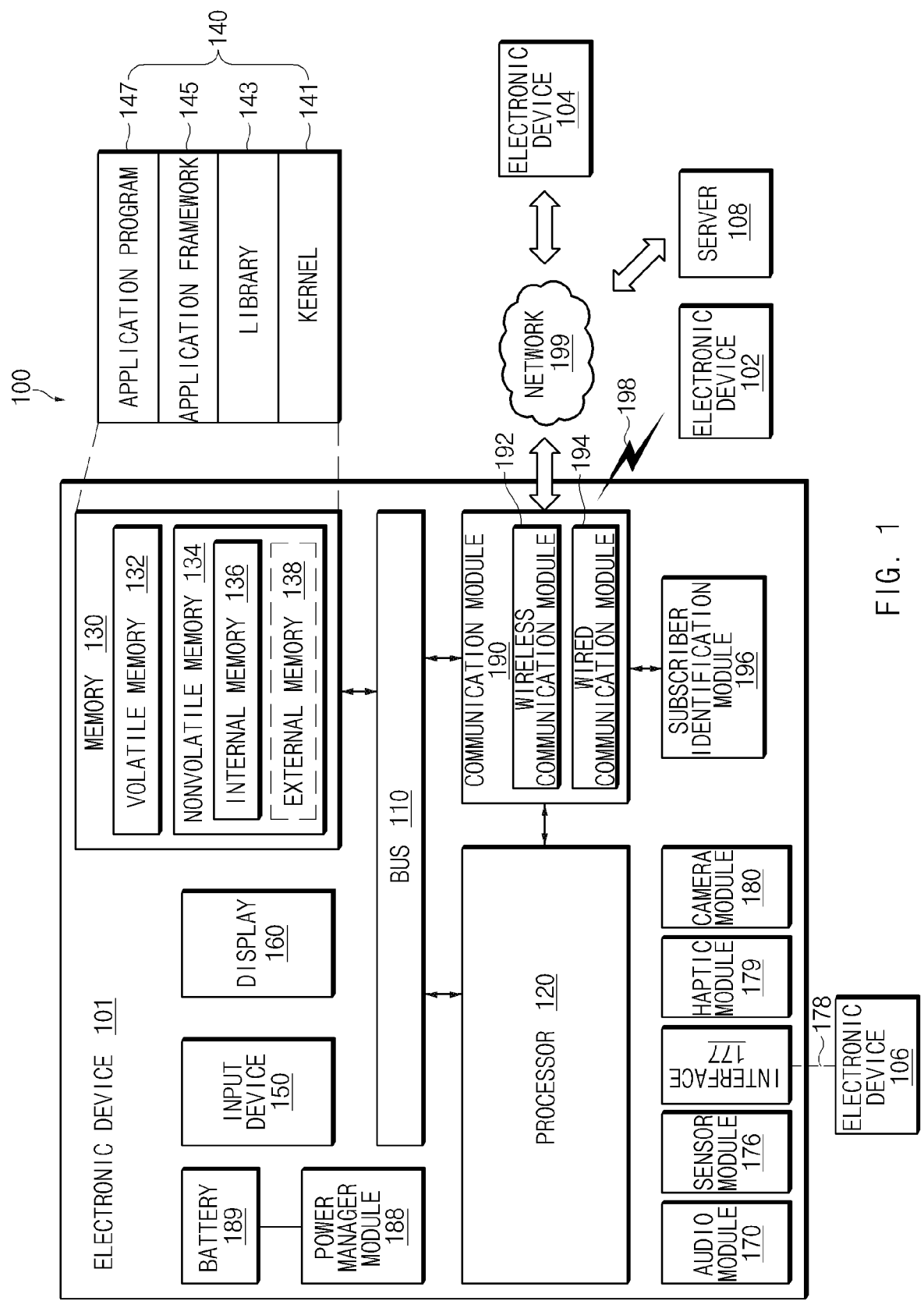
FIG. 1 is a block diagram of an electronic device in a network environment, according to various embodiments.

FIG. 1 is a block diagram of an electronic device 101 in a network environment 100, according to various embodiments. An electronic device according to various embodiments of the disclosure may include various forms of devices. For example, the electronic device may include at least one of, for example, portable communication devices (e.g., smartphones), computer devices (e.g., personal digital assistants (PDAs), tablet personal computers (PCs), laptop PCs, desktop PCs, workstations, or servers), portable multimedia devices (e.g., electronic book readers or Motion Picture Experts Group (MPEG-1 or MPEG-2) Audio Layer 3 (MP3) players), portable medical devices (e.g., heartbeat measuring devices, blood glucose monitoring devices, blood pressure measuring devices, and body temperature measuring devices), cameras, or wearable devices. The wearable device may include at least one of an accessory type (e.g., watches, rings, bracelets, anklets, necklaces, glasses, contact lens, or head-mounted-devices (HMDs)), a fabric or garment-integrated type (e.g., an electronic apparel), a body-attached type (e.g., a skin pad or tattoos), or a bio-implantable type (e.g., an implantable circuit). According to various embodiments, the electronic device may include at least one of, for example, televisions (TVs), digital versatile disk (DVD) players, audios, audio accessory devices (e.g., speakers, headphones, or headsets), refrigerators, air conditioners, cleaners, ovens, microwave ovens, washing machines, air cleaners, set-top boxes, home automation control panels, security control panels, game consoles, electronic dictionaries, electronic keys, camcorders, or electronic picture frames.

In another embodiment, the electronic device may include at least one of navigation devices, satellite navigation system (e.g., Global Navigation Satellite System (GNSS)), event data recorders (EDRs) (e.g., black box for a car, a ship, or a plane), vehicle infotainment devices (e.g., head-up display for vehicle), industrial or home robots, drones, automated teller machines (ATMs), points of sales (POS s), measuring instruments (e.g., water meters, electricity meters, or gas meters), or internet of things (e.g., light bulbs, sprinkler devices, fire alarms, thermostats, or street lamps). The electronic device according to an embodiment of the disclosure may not be limited to the above-described devices, and may provide functions of a plurality of devices like smartphones which have measurement function of personal biometric information (e.g., heart rate or blood glucose). In the disclosure, the term "user" may refer to a person who uses an electronic device or may refer to a device (e.g., an artificial intelligence electronic device) that uses the electronic device.

Referring to FIG. 1, under the network environment 100, the electronic device 101 (e.g., an electronic device 301a) may communicate with an electronic device 102 through short-range wireless communication 198 or may communication with an electronic device 104 or a server 108 through a network 199. According to an embodiment, the electronic device 101 may communicate with the electronic device 104 through the server 108.

According to an embodiment, the electronic device 101 may include a bus 110, a processor 120 (e.g., a processor 310a), a memory 130, an input device 150 (e.g., a microphone or a mouse), a display device 160, an audio module 170, a sensor module 176, an interface 177, a haptic module 179, a camera module 180, a power management module 188, a battery 189, a communication module 190, and a subscriber identification module 196. According to an embodiment, the electronic device 101 may not include at least one (e.g., the display device 160 or the camera module 180) of the above-described components or may further include other component(s).

The bus 110 may interconnect the above-described components 120 to 190 and may include a circuit for conveying signals (e.g., a control message or data) between the above-described components.

The processor 120 may include one or more of a central processing unit (CPU), an application processor (AP), a graphic processing unit (GPU), an image signal processor (ISP) of a camera or a communication processor (CP). According to an embodiment, the processor 120 may be implemented with a system on chip (SoC) or a system in package (SiP). For example, the processor 120 may drive an operating system (OS) or an application program to control at least one of another component (e.g., hardware or software component) of the electronic device 101 connected to the processor 120 and may process and compute various data. The processor 120 may load a command or data, which is received from at least one of other components (e.g., the communication module 190), into a volatile memory 132 to process the command or data and may store the result data into a nonvolatile memory 134.

The memory 130 may include, for example, the volatile memory 132 or the nonvolatile memory 134. The volatile memory 132 may include, for example, a random access memory (RAM) (e.g., a dynamic RAM (DRAM), a static RAM (SRAM), or a synchronous DRAM (SDRAM)). The nonvolatile memory 134 may include, for example, a programmable read-only memory (PROM), an one time PROM (OTPROM), an erasable PROM (EPROM), an electrically EPROM (EEPROM), a mask ROM, a flash ROM, a flash memory, a hard disk drive (HDD), or a solid-state drive (SSD). In addition, the nonvolatile memory 134 may be configured in the form of an internal memory 136 or the form of an external memory 138 which is available through connection only if necessary, according to the connection with the electronic device 101. The external memory 138 may further include a flash drive such as compact flash (CF), secure digital (SD), micro secure digital (Micro-SD), mini secure digital (Mini-SD), extreme digital (xD), a multimedia card (MMC), or a memory stick. The external memory 138 may be operatively or physically connected with the electronic device 101 in a wired manner (e.g., a cable or a universal serial bus (USB)) or a wireless (e.g., Bluetooth) manner.

For example, the memory 130 may store, for example, at least one different software component, such as a command or data associated with the program 140, of the electronic device 101. The program 140 may include, for example, a kernel 141, a library 143, an application framework 145 or an application program (interchangeably, "application") 147.

The input device 150 may include a microphone, a mouse, or a keyboard. According to an embodiment, the keyboard may include a keyboard physically connected or a virtual keyboard displayed through the display device 160.

The display device 160 may include a display, a hologram device or a projector, and a control circuit to control a relevant device. The display may include, for example, a liquid crystal display (LCD), a light emitting diode (LED) display, an organic LED (OLED) display, a microelectromechanical systems (MEMS) display, or an electronic paper display. According to an embodiment, the display may be flexibly, transparently, or wearably implemented. The display may include a touch circuitry, which is able to detect a user's input such as a gesture input, a proximity input, or a hovering input or a pressure sensor (interchangeably, a force sensor) which is able to measure the intensity of the pressure by the touch. The touch circuit or the pressure sensor may be implemented integrally with the display or may be implemented with at least one sensor separately from the display. The hologram device may show a stereoscopic image in a space using interference of light. The projector may project light onto a screen to display an image. The screen may be located inside or outside the electronic device 101.

The audio module 170 may convert, for example, from a sound into an electrical signal or from an electrical signal into the sound. According to an embodiment, the audio module 170 may acquire sound through the input device 150 (e.g., a microphone) or may output sound through an output device (not illustrated) (e.g., a speaker or a receiver) included in the electronic device 101, an external electronic device (e.g., the electronic device 102 (e.g., a wireless speaker or a wireless headphone)) or an electronic device 106 (e.g., a wired speaker or a wired headphone) connected with the electronic device 101.

The sensor module 176 may measure or detect, for example, an internal operating state (e.g., power or temperature) of the electronic device 101 or an external environment state (e.g., an altitude, a humidity, or brightness) to generate an electrical signal or a data value corresponding to the information of the measured state or the detected state. The sensor module 176 may include, for example, at least one of a gesture sensor, a gyro sensor, a barometric pressure sensor, a magnetic sensor, an acceleration sensor, a grip sensor, a proximity sensor, a color sensor (e.g., a red, green, blue (RGB) sensor), an infrared sensor, a biometric sensor (e.g., an iris sensor, a fingerprint senor, a heartbeat rate monitoring (HRM) sensor, an e-nose sensor, an electromyography (EMG) sensor, an electroencephalogram (EEG) sensor, an electrocardiogram (ECG) sensor), a temperature sensor, a humidity sensor, an illuminance sensor, or an UV sensor. The sensor module 176 may further include a control circuit for controlling at least one or more sensors included therein. According to an embodiment, the electronic device 101 may control the sensor module 176 by using the processor 120 or a processor (e.g., a sensor hub) separate from the processor 120. In the case that the separate processor (e.g., a sensor hub) is used, while the processor 120 is in a sleep state, the separate processor may operate without awakening the processor 120 to control at least a portion of the operation or the state of the sensor module 176.

According to an embodiment, the interface 177 may include a high definition multimedia interface (HDMI), a universal serial bus (USB), an optical interface, a recommended standard 232 (RS-232), a D-subminiature (D-sub), a mobile high-definition link (MHL) interface, a SD card/MMC (multi-media card) interface, or an audio interface. A connector 178 may physically connect the electronic device 101 and the electronic device 106. According to an embodiment, the connector 178 may include, for example, an USB connector, an SD card/MMC connector, or an audio connector (e.g., a headphone connector).

The haptic module 179 may convert an electrical signal into mechanical stimulation (e.g., vibration or motion) or into electrical stimulation. For example, the haptic module 179 may apply tactile or kinesthetic stimulation to a user. The haptic module 179 may include, for example, a motor, a piezoelectric element, or an electric stimulator.

The camera module 180 may capture, for example, a still image and a moving picture. According to an embodiment, the camera module 180 may include at least one lens (e.g., a wide-angle lens and a telephoto lens, or a front lens and a rear lens), an image sensor, an image signal processor, or a flash (e.g., a light emitting diode or a xenon lamp).

The power management module 188, which is to manage the power of the electronic device 101, may constitute at least a portion of a power management integrated circuit (PMIC).

The battery 189 may include a primary cell, a secondary cell, or a fuel cell and may be recharged by an external power source to supply power at least one component of the electronic device 101.

The communication module 190 may establish a communication channel between the electronic device 101 and an external device (e.g., the first external electronic device 102, the second external electronic device 104, or the server 108). The communication module 190 may support wired communication or wireless communication through the established communication channel. According to an embodiment, the communication module 190 may include a wireless communication module 192 or a wired communication module 194. The communication module 190 may communicate with the external device through a first network 198 (e.g. a short range communication network such as Bluetooth or infrared data association (IrDA)) or a second network 199 (e.g., a wireless wide area network such as a cellular network) through a relevant module among the wireless communication module 192 or the wired communication module 194.

The wireless communication module 192 may support, for example, cellular communication, short-range wireless communication, global navigation satellite system (GNSS) communication. The cellular communication may include, for example, long-term evolution (LTE), LTE Advance (LTE-A), code division multiple access (CDMA), wideband CDMA (WCDMA), universal mobile telecommunications system (UMTS), Wireless Broadband (WiBro), or Global System for Mobile Communications (GSM). The short-range wireless communication may include wireless fidelity (Wi-Fi), Wi-Fi Direct, light fidelity (Li-Fi), Bluetooth, Bluetooth low energy (BLE), Zigbee, near field communication (NFC), magnetic secure transmission (MST), radio frequency (RF), or a body area network (BAN). The GNSS may include at least one of a Global Positioning System (GPS), a Global Navigation Satellite System (Glonass), Beidou Navigation Satellite System (Beidou), the European global satellite-based navigation system (Galileo), or the like. In the disclosure, "GPS" and "GNSS" may be interchangeably used.

According to an embodiment, when the wireless communication module 192 supports cellar communication, the wireless communication module 192 may, for example, identify or authenticate the electronic device 101 within a communication network using the subscriber identification module (e.g., a SIM card) 196. According to an embodiment, the wireless communication module 192 may include a communication processor (CP) separate from the processor 120 (e.g., an application processor (AP)). In this case, the communication processor may perform at least a portion of functions associated with at least one of components 110 to 196 of the electronic device 101 in substitute for the processor 120 when the processor 120 is in an inactive (sleep) state, and together with the processor 120 when the processor 120 is in an active state. According to an embodiment, the wireless communication module 192 may include a plurality of communication modules, each supporting only a relevant communication scheme among cellular communication, short-range wireless communication, or a GNSS communication.

The wired communication module 194 may include, for example, a local area network (LAN) service, a power line communication, or a plain old telephone service (POTS).

For example, the first network 198 may employ, for example, Wi-Fi direct or Bluetooth for transmitting or receiving commands or data through wireless direct connection between the electronic device 101 and the first external electronic device 102. The second network 199 may include a telecommunication network (e.g., a computer network such as a LAN or a WAN, the Internet or a telephone network) for transmitting or receiving commands or data between the electronic device 101 and the second electronic device 104.

According to various embodiments, the commands or the data may be transmitted or received between the electronic device 101 and the second external electronic device 104 through the server 108 connected with the second network 199. Each of the first and second external electronic devices 102 and 104 may be a device of which the type is different from or the same as that of the electronic device 101. According to various embodiments, all or a part of operations that the electronic device 101 will perform may be executed by another or a plurality of electronic devices (e.g., the electronic devices 102 and 104 or the server 108). According to an embodiment, in the case that the electronic device 101 executes any function or service automatically or in response to a request, the electronic device 101 may not perform the function or the service internally, but may alternatively or additionally transmit requests for at least a part of a function associated with the electronic device 101 to any other device (e.g., the electronic device 102 or 104 or the server 108). The other electronic device (e.g., the electronic device 102 or 104 or the server 108) may execute the requested function or additional function and may transmit the execution result to the electronic device 101. The electronic device 101 may provide the requested function or service using the received result or may additionally process the received result to provide the requested function or service. To this end, for example, cloud computing, distributed computing, or client-server computing may be used.

Figure 2:
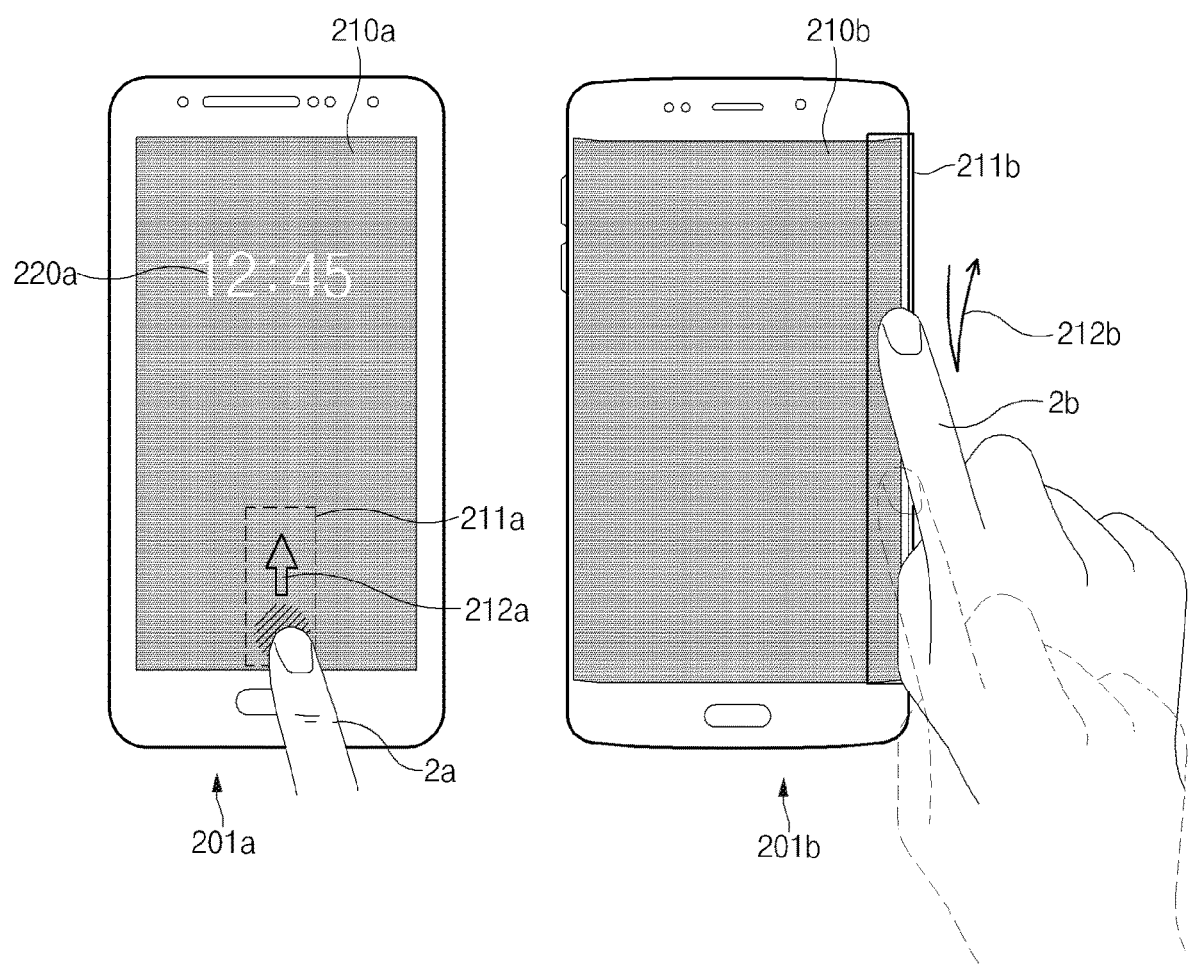
FIG. 2 is a view illustrating an electronic device operating in a sleep mode according to an embodiment.

FIG. 2 is a view illustrating an electronic device operating in a sleep mode according to an embodiment.

According to an embodiment, a processor may support an awake mode and a sleep mode as an operation mode. The awake mode may refer to an operation mode in which the processor may perform all required functions. The sleep mode may refer to an operation mode in which power is supplied to the electronic device but the power consumption is minimized by limiting some functions of the processor.

According to an embodiment, in an electronic device operating in a sleep mode, for example, a communication module, a camera module, a sensor module, an audio module, and the like may perform only limited functions. The modules may transmit an interrupt signal to a processor if a specified condition is met. According to an embodiment, the processor operating in the sleep mode may switch the operation mode to the awake mode in response to the interrupt signal received from the module.

Referring to FIG. 2, an electronic device 201*a* and 201*b* according to various embodiments are illustrated. According to various embodiments, a display 210*a* and 210*b* of the electronic device 201*a* and 201*b* may be turned on or off corresponding to the operation mode of the processor. According to an embodiment, the display 210*b* of the electronic device 201*b* operating in the sleep mode may be turned off. According to an embodiment, in the electronic device 201*a* operating in the sleep mode, some pixels included in the display 210*a* may be partially turned off, and some of the other pixels may be turned on to implement always-on-display (AOD). For example, some of the other pixels may be turned on to represent a digital clock 220*a*.

According to various embodiments, in the electronic device 201*a* and 201*b* operating in the sleep mode, the display 210*a* and 210*b* may recognize a touch 2*a* and 2*b* of a user through a specified area 211*a* and 211*b*. When the touch 2*a* and 2*b* of the user is made outside the specified area 211*a* and 211*b*, the electronic device 201*a* and 201*b* may not recognize the touch 2*a* and 2*b* of the user.

According to various embodiments, the specified area 211*a* and 211*b* may be a part or all of the entire areas of the display 210*a* and 210*b* or may correspond to a separate display area. For example, referring to the electronic device 201*a*, the specified area 211*a* may be located at the center of a lower end of the display 210*a*. As another example, referring to the electronic device 201*b*, the specified area 211*b* may correspond to a sub display area located at the side surface of the display 210*b*. According to various embodiments, the sub display area may mean a part of the side surface of the display 210*a* and 210*b* implemented in a single configuration.

According to an embodiment, when the touch 2*a* and 2*b* of the user are made inside the specified area 211*a* and 211*b*, the electronic device 201*a* and 201*b* may recognize the touch 2*a* and 2*b* of the user and perform a specified operation. For example, the specified operation may include an operation of determining whether the touch 2*a* and 2*b* of the user corresponds to a specified touch pattern.

According to an embodiment, the specified touch pattern may include a tap, a double tap, or a gesture of performing a touch move from a first location to a second location. The tab may be understood as the touch of the user is removed after the touch is made in the area including a specific location. It may be understood as the double tap that the tab occurs twice within a specified time period. The touch move may be understood as being moved to an area including a second location without including a first location after being made by the user in the area including the first location without being removed. According to various embodiments, the touch move is not limited to linearly moving from the first location to the second location. According to various embodiments, the touch move is not limited to movement between two locations but may include movement between three or more locations.

When the touch 2*a* and 2*b* of the user corresponds to the specified touch pattern, the electronic device 201*a* and 201*b* may provide the specified haptic feedback to the user and turn on the display 210*a* and 210*b*, turn off some pixels that are turned on to implement the AOD, output specified contents, or execute a specified application. When the touch 2*a* and 2*b* of the user does not correspond to the specified touch pattern, the electronic device 201*a* and 201*b* may maintain the off state of the display 210*a* and 210*b* or turn on only some pixels to implement the AOD.

For example, referring to the electronic device 201*a*, the specified touch pattern may include a gesture 212*a* for performing a touch move upward from a lower end inside the specified area 211*a* of the display 210*a*. In this case, when the touch 2*a* of the user corresponds to the specified touch pattern, the electronic device 201*a* may provide the specified haptic feedback to the user, execute a payment application, and display a specified payment graphical user interface (GUI) 210.

As another example, referring to the electronic device 201*b*, the specified touch pattern may include a gesture 212*b* for performing a touch move from top to bottom and again from bottom to top in a specified area 211b of the display 210b. In this case, when the touch 2b of the user corresponds to the specified touch pattern, the electronic device 201b may output a GUI that provides information about a date, time, temperature to the specified area 211b, and the like while providing a specified haptic feedback to the user.

Figure 3A:
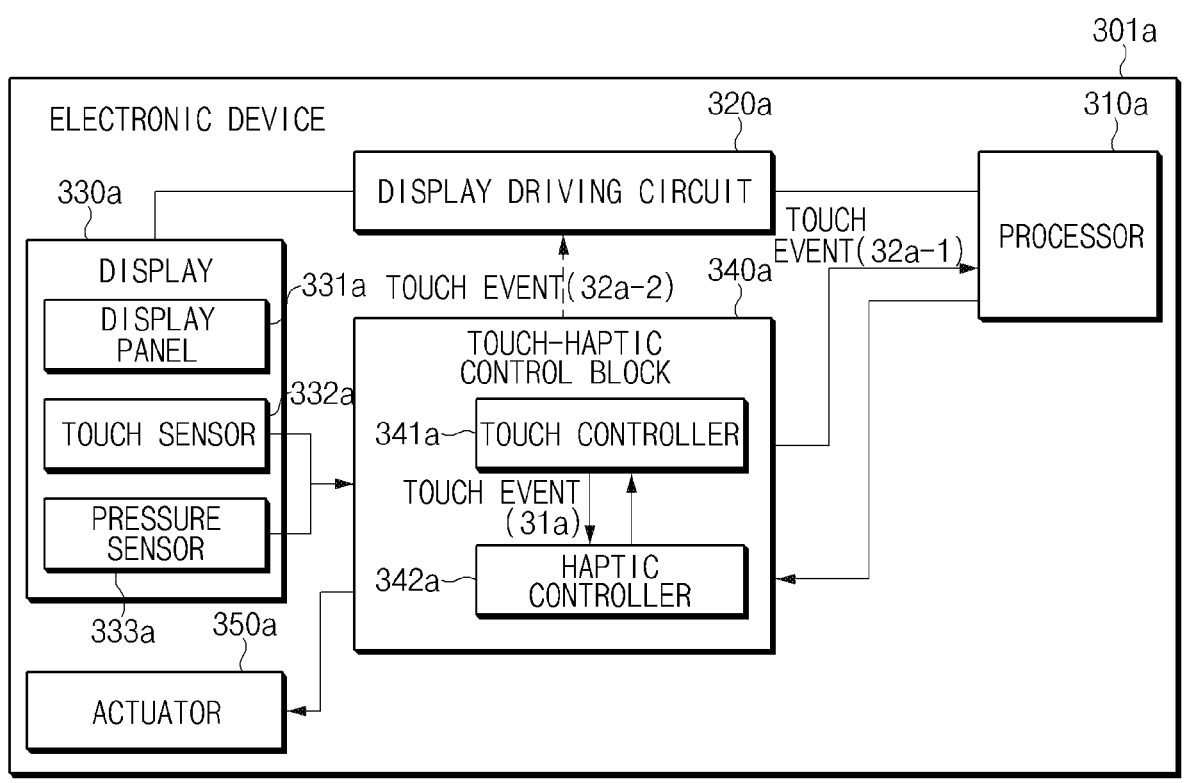
FIG. 3A is a block diagram of an electronic device for processing an input touch and implementing a haptic feedback according to various embodiments.

FIG. 3A is a block diagram of the electronic device 301a for processing an input touch and implementing a haptic feedback according to various embodiments.

Referring to FIG. 3A, the electronic device 301a may include the processor 310a, a display driving circuit 320a, a display 330a, a touch-haptic control block 340a, and an actuator 350a. According to various embodiments, at least one of the components of the electronic device 301a illustrated in FIG. 3A may be omitted or other components may be further included in the electronic device 301a.

For example, the processor 310a may perform necessary operations or data processing for control or communication with respect to other components of the electronic device 301a. In various embodiments, the processor 310a may be a CPU, a CP, a sensor hub, or an AP. According to an embodiment, the processor 310a may support an operation mode including a sleep mode and an awake mode.

The display driving circuit 320a may receive image data from the processor 310a and output the image data to a display panel 331a. For example, the display driving circuit 320a may supply an image signal corresponding to the image data received from the processor 310a to the display panel 331a at a preset frame rate.

The display 330a may include the display panel 331a, a touch sensor 332a, and a pressure sensor 333a. According to various embodiments, at least one of the components 331a, 332a and 333a of the display 330a may be omitted or other components may be further included.

The display panel 331a may receive an image signal from the display driving circuit 320a. The display panel 331a may display various contents (e.g., text, an image, a video, an icon, a GUI, a symbol, and the like) based on the image signal. In the disclosure, "It is output to the display" may be understood as the same meaning as "It is output to the display panel".

In an embodiment, the display panel 331a may be overlapped with the touch sensor 332a and the pressure sensor 333a. For example, when the display panel 331a and the touch sensor 332a are combined, the combination may be referred to as "touch screen display".

The touch sensor 332a may sense a touch of a user from the entire output area of the display 330a. In an embodiment, the user touch may include a direct touch or a proximity touch (e.g., hovering). When a user touch occurs, a specified physical quantity (e.g., voltage, light quantity, resistance, charge amount, capacitance, and the like) may change in the touch sensor 332a, and the touch sensor 332a may transmit the change in the physical quantity to a touch controller 341a. According to an embodiment, the transmitted change in the physical quantity may be referred to as a "touch signal".

The pressure sensor 333a may sense an external pressure (or force) from the entire area or a portion of the area of the display 330a. For example, the pressure sensor 333a may sense a pressure applied by a finger of the user to the display 330a. According to an embodiment, when a user touch occurs, a physical quantity specified by the touch (e.g., capacitance formed between electrodes of the pressure sensor, a current amount induced in an inductor forming a pressure sensor, resistance of a conductor forming the pressure sensor, a current or a voltage difference generated by a piezoelectric material forming the pressure sensor, and the like) may be changed in the pressure sensor 333a, and the pressure sensor 333a transmits the change in the physical quantity to the touch controller 342a. In an embodiment, the transmitted change in the physical quantity may be referred to as a "pressure signal".

The touch-haptic control block 340a may process the input touch and drive the actuator based on the specified haptic pattern. According to an embodiment, the touch-haptic control block 340a may include the touch controller 341a and a haptic controller 342a. According to an embodiment, the touch-haptic control block may be implemented by being included as at least part of a single integrated circuit (IC).

The touch controller 341a may be electrically connected to the touch sensor 332a and/or the pressure sensor 333a. According to an embodiment, the touch controller 341a may calculate data (e.g., coordinate data (X, Y) of a location at which the touch is made, an input value (Z) of the touch, and the like) based on the touch signal or the pressure signal received from the touch sensor 332a or the pressure sensor 333a.

The haptic controller 342a may drive the actuator 350a in response to the reception of the interrupt signal from the touch controller 341a. According to an embodiment, the haptic controller 342a may directly communicate with the touch controller 341a in receiving the interrupt signal. The direct communication may be understood as communication between each other not through the processor 310a of the electronic device 301a. In an embodiment, the interrupt signal may correspond to a touch event 31a.

The actuator 350a may be driven by the haptic controller 342a and may correspond to a linear resonant actuator (LRA) or an eccentric rotating mass (ERM). The LRA may correspond to an actuator that generates vibration by using a resonance phenomenon caused by a weight, a spring, and a coil. The ERM may correspond to an actuator that generates vibrations by an eccentric rotating by the driving voltage.

In various embodiments described below, the processor 310a may operate in a sleep mode and the display 330a may be turned off or only some pixels may be partially turned on to implement the AOD.

According to an embodiment, when the touch sensor 332a senses a user touch, the touch sensor 332a may transmit a touch signal to the touch controller 341a. In an embodiment, the user touch may be made in a specific pattern, and the touch signal may be continuously generated based on the specific pattern. The touch controller 341a may obtain the specific pattern by continuously calculating coordinate data (X, Y) of the location at which the touch has been made from the continuous touch signal. The touch controller 341a may determine whether the obtained touch pattern corresponds to a specified pattern.

In various embodiments, the specified pattern may include a plurality of patterns. For example, the specified pattern may include a tap, a double tap, or a gesture of performing touch move from a first location to a second location.

According to an embodiment, when a user touch corresponds to a specified pattern, the touch controller 341a may transmit the touch event 31a to the haptic controller 342a. The haptic controller 342a may generate an interrupt and drive the actuator 350a in response to the reception of the touch event.

According to an embodiment of the disclosure, the touch controller 341a may determine a haptic pattern to be provided to the user according to the determined touch pattern. The touch controller 341a may transmit information about the determined haptic pattern to the haptic controller 342a. In various embodiments, the haptic pattern may be variously set as the intensity, time, number of times, or a combination thereof.

According to an embodiment, the touch controller 341a may determine whether the touch signal of a user corresponds to a touch pattern after determining whether the touch signal of a user corresponds to a touch made in a specified area (e.g., 211a and 211b of FIG. 2) of the area of the display 330a. For example, when the user touch is sensed outside the specified area, the touch controller 341a may not recognize the touch signal and may not determine whether the user touch corresponds to the specified pattern. As another example, when the user touch is sensed in the specified area, the touch controller 341a may determine whether the sensed touch corresponds to the specified touch pattern.

According to an embodiment, the specified area may correspond to an area where a specific operation is performed in response to a touch made by the user. For example, the specific operation may be an operation corresponding to pressing a home button in an electronic device having a physical home button.

According to an embodiment, the touch controller 341a may determine one of the plurality of haptic patterns based on whether the touch signal corresponds to the touch made in the specified area. The touch controller 341a may transmit information about the determined haptic pattern to the haptic controller 342a. For example, the touch controller 341a may distinguish between the case where the touch is made inside the specified area and the case where the touch is made outside the specified area, and determine that the haptic patterns are different from each other.

According to an embodiment, the touch controller 341a may determine the haptic pattern based on the distance between the specified area and the location at which the touch is made. For example, the touch controller 341a may calculate the distance between the central location of the specified area and the location at which the touch is made. The touch controller 341a may determine one of the plurality of haptic patterns based on the calculated distance, and transmit information about the determined haptic pattern to the haptic controller 342a. For example, the touch controller 341a may be set to provide a haptic feedback having a stronger intensity as the location at which the touch is made gets closer to the specified area.

For example, the central location of the specified area may be understood as the center of gravity in the form of the specified area. For example, when the specified area is a triangle, the central location of the specified area may be understood as a location at which three medians of the triangle intersect with each other.

According to an embodiment, the touch controller 341a may determine the haptic pattern by further considering the pressure of the touch measured by the pressure sensor 333a. For example, the touch controller 341a may determine whether the measured touch pressure is greater than or equal to a specified value, and then determine whether the user touch corresponds to the specified touch pattern and determine the haptic pattern. When the haptic pattern is determined based on the determination result, the information about the haptic pattern may be transmitted to the haptic controller 342a. According to various embodiments, the touch controller 341a may determine the haptic pattern based only on the measured pressure of the touch.

In an embodiment, the haptic controller 342a may receive the information about the haptic pattern from the touch controller 341a. In an embodiment, the haptic controller 342a may control the driving of the actuator 350a based on the haptic pattern.

According to an embodiment, when the user touch corresponds to the specified pattern, the touch controller 341a may generate a touch event 32a-1 in the processor 310a such that the electronic device 301a may perform an additional operation together with the operation of providing the haptic feedback. The touch event 32a-1 may be independent of the touch event 31a transmitted to the haptic controller. The processor 310a may generate an interrupt in response to the reception of the touch event 32a-1 from the touch controller 341a and change the operation mode from the sleep mode to the awake mode.

According to an embodiment, when receiving the touch event 32a-1, the processor 310a may switch the operation mode from the sleep mode to the awake mode and output the specified GUI to the display 330a. In an embodiment, the GUI may be output to a specified area of the entire area of the display 330a. For example, the specified area may include a location where the touch is made.

For example, when the user inputs a touch corresponding to the specified touch pattern in the specified area of the display 330a, the processor 310a may switch the operation mode to the awake mode and output the GUI (e.g., GUI of a pre-selected payment card) corresponding to the payment application.

Figure 8:
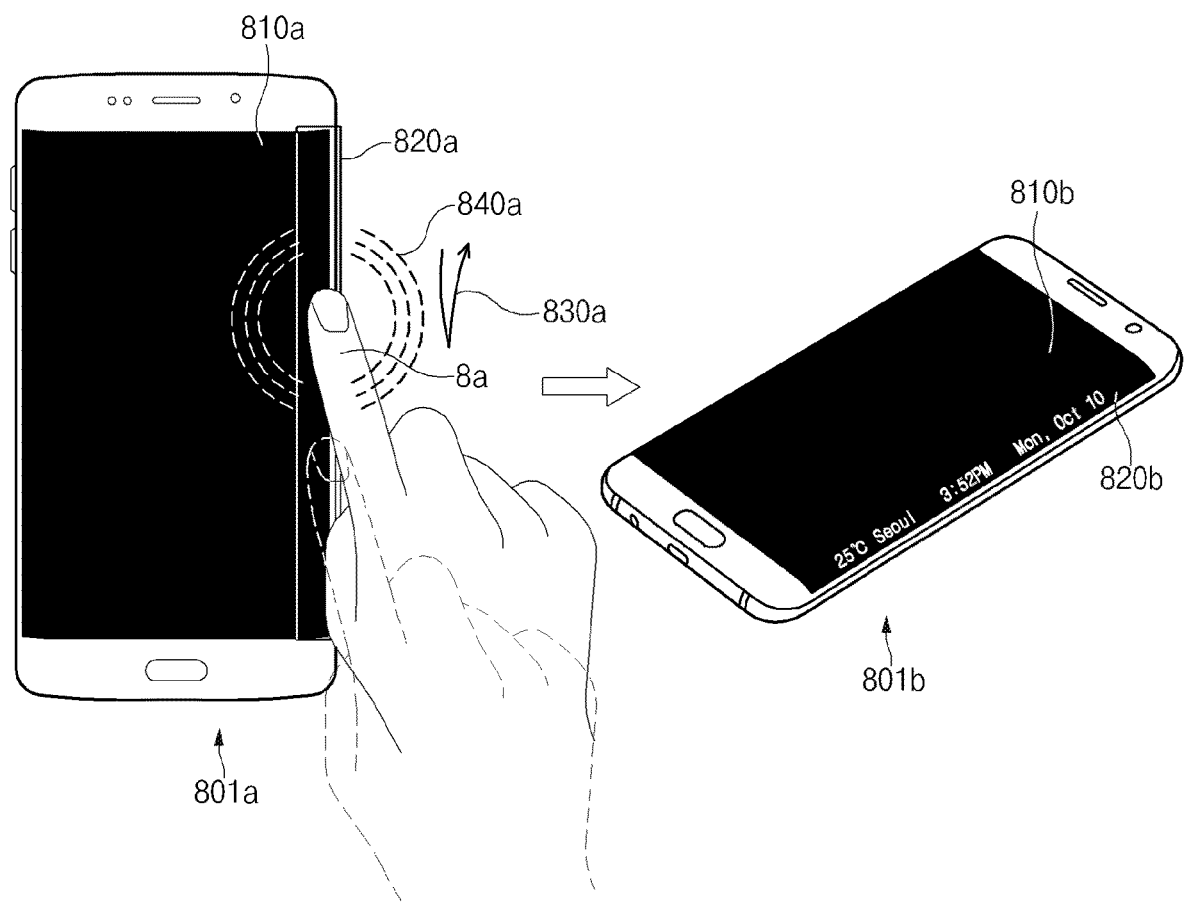
FIG. 8 is a view illustrating a method of providing, by an electronic device, an immediate haptic feedback according to various embodiments.

As another example, referring to FIG. 8, the user may perform an operation of performing a touch move from top to bottom and again from bottom to top in the area of a sub display 820a positioned at the side of a main display 810a. In this case, when the touch move corresponds to a specified touch pattern, the processor 310a may switch the operation mode to the awake mode and output a GUI representing a date, time, temperature, and the like to the area of the sub display 820a in which the touch is made.

According to an embodiment, a touch event 32a-2 may be transmitted to the display driving circuit 320a. The display driving circuit 320a may be set to output a specified GUI to the display 330a in response to the reception of the touch event 32a-2. In the above-described embodiment, the processor 310a may maintain the operation mode in the sleep mode.

Figure 3B:
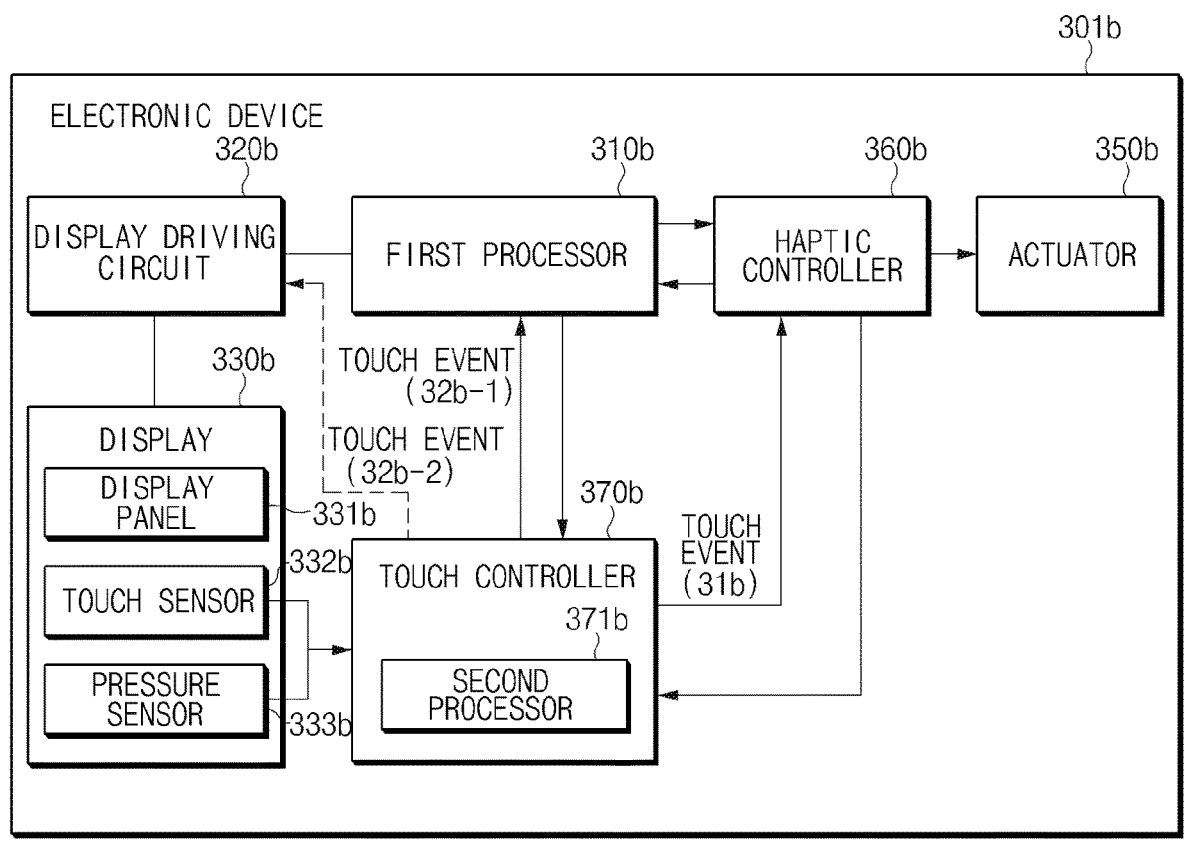
FIG. 3B is a block diagram of an electronic device having a second processor for processing an input touch and implementing a haptic feedback according to various embodiments.

FIG. 3B is a block diagram of an electronic device 301b having a second processor for processing an input touch and implementing a haptic feedback according to various embodiments.

Referring to FIG. 3, the electronic device 301b may include a first processor 310b, a display driving circuit 320b, a display 330b, an actuator 350b, a haptic controller 360b, and a touch controller 370b. In the description of FIG. 3B, redundant descriptions of the configuration described in FIG. 3A may be omitted.

The touch controller 370b may include a second processor 371b which is separate from the first processor 310b and electrically connected to a touch sensor 332b-1 or the pressure sensor 333b. According to an embodiment, when the first processor 310b operates in the sleep mode, the second processor 371b may perform communication between the touch controller 370b and the haptic controller 360b.

In an embodiment, the second processor 371b may determine whether a user touch corresponds to a specified pattern.

When the user touch corresponds to the specified touch pattern, the second processor 371*b* may generate a touch event 31*b* and transmit the generated touch event 31*b* to the haptic controller 360*b*. When the touch event 31*b* is transmitted to the haptic controller 360*b*, the haptic controller 360*b* may generate an interrupt and drive the actuator 350*b*.

In an embodiment, the second processor 371*b* may determine the haptic pattern based on the touch pattern corresponding to the touch of the user. The information about the determined haptic pattern may be transmitted to the haptic controller 360*b*.

According to an embodiment, the second processor 371*b* may determine whether the touch of the user corresponds to a touch pattern after determining whether the touch is made in a specified area (e.g., 211*a* and 211*b* of FIG. 2) of the area of the display 330*a*. For example, when the user touch is sensed outside the specified area, the second processor 371*b* may not recognize the touch signal and may not determine whether the touch corresponds to the specified pattern. As another example, when the user touch is sensed in the specified area, the second processor 371*b* may determine whether the sensed touch corresponds to the specified touch pattern.

According to an embodiment, the specified area may correspond to an area where a specific operation is performed corresponding to a touch made by the user. For example, the specific operation may be an operation corresponding to pressing a home button in an electronic device having a physical home button.

According to an embodiment, the second processor 371*b* may determine one of the plurality of haptic patterns corresponding to whether the touch signal corresponds to the touch made in the specified area. The second processor 371*b* may transmit information about the determined haptic pattern to the haptic controller 360*b*. For example, the second processor 371*b* may distinguish between the case where the touch is made inside the specified area and the case where the touch is made outside the specified area, and determine that the haptic patterns are different from each other.

According to an embodiment, the second processor 371*b* may determine the haptic pattern based on the distance between the specified area and the location at which the touch is made. For example, the second processor 371*b* may calculate a distance between the central location of the specified area and the location at which the touch is made. The second processor 371*b* may determine one of the plurality of haptic patterns based on the calculated distance, and transmit information about the determined haptic pattern to the haptic controller 360*b*. For example, the second processor 371*b* may be set to provide a haptic feedback having a stronger intensity as the location at which the touch is made gets closer to the specified area.

According to an embodiment, the second processor 371*b* may determine the haptic pattern by further considering the pressure of the touch measured by the pressure sensor 333*b*. For example, the second processor 371*b* may determine whether the measured touch pressure is greater than or equal to a specified value, and then determine whether the user touch corresponds to the specified touch pattern and determine the haptic pattern. When the haptic pattern is determined based on the determination result, the information about the haptic pattern may be transmitted to the haptic controller 342*b*. According to various embodiments, the second processor 371*b* may determine the haptic pattern based only on the measured pressure of the touch.

In an embodiment, when the user touch corresponds to the specified pattern, the second processor 371*b* may generate a touch event 32*b*-1 in the first processor 310*b* such that the electronic device 301*b* may perform an additional operation together with the operation of providing the haptic feedback. The touch event 32*b*-1 may be independent of the touch event 31*b* transmitted to the haptic controller. When the first processor 310*b* operating in the sleep mode receives the touch event 32*b*-1, the first processor 310*b* may generate an interrupt and switch the operation mode to the awake mode. In one embodiment, when receiving the touch event 32*b*-1, the first processor 310*b* may switch the operation mode from the sleep mode to the awake mode and output the specified GUI to the display 330*b*.

According to an embodiment, a touch event 32*b*-2 may be transmitted to the display driving circuit 320*b*. The display driving circuit 320*b* may be set to output a specified GUI to the display 330*b* in response to receiving the touch event 32*b*-2. In the above embodiment, the first processor 310*b* may maintain the operation mode in the sleep mode.

Figure 4:
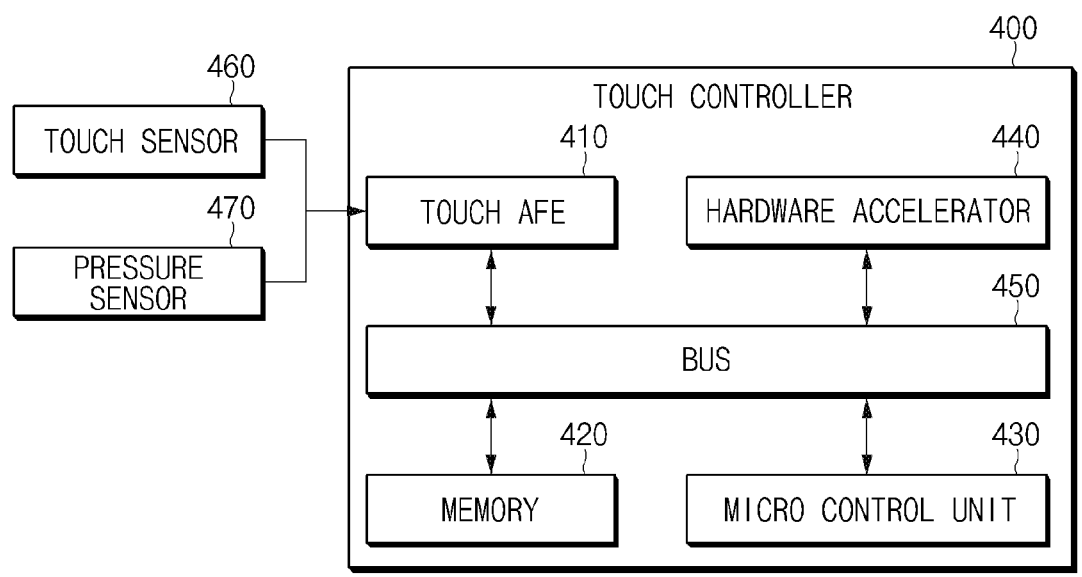
FIG. 4 is a block diagram of a touch controller according to various embodiments.

FIG. 4 is a block diagram of a touch controller 400 according to various embodiments.

The touch controller 400 may analyze and process the touch signal transmitted from a touch sensor 460 or a pressure sensor 470. The touch controller 400 may include a touch analog front end (AFE) 410, a hardware accelerator 440, a bus 450, a memory 420, and a micro control unit (MCU) 430. For example, the touch controller 400 may correspond to the touch controller 341*a* of FIG. 3A.

The touch AFE 410 may convert an analog signal representing a physical quantity (e.g., voltage, light quantity, resistance, charge amount, capacitance, and the like) measured by the touch sensor 460 or the pressure sensor 470 into a digital signal.

The memory 420 may store data on a user touch, data on an area on the display on which the touch is to be recognized, data on a specified touch pattern, data on a specified haptic pattern, and the like. For example, the data on the user touch may include a location where a touch is made, a touch pattern, a pressure at which the touch is made, and the like. In an embodiment, the memory 420 may store instructions in which an algorithm for determining whether a touch signal corresponds to a touch made in a specified area, an algorithm for comparing touch patterns, or an algorithm for determining a haptic pattern is implemented. According to various embodiments, the memory 420 may include a static random access memory (SRAM) or an embedded non-volatile memory (eNVM).

The micro control unit 430 may execute the instructions on the data stored in the memory 420.

In an embodiment, the micro control unit 430 may determine whether a user touch is input. According to an embodiment, the micro control unit 430 may calculate a location where the user touch is made and determine whether the touch is made within a specified area.

In an embodiment, the micro control unit 430 may determine whether the user touch corresponds to a specified touch pattern. When the user touch corresponds to the specified touch pattern, the micro control unit 430 may transmit a touch event (e.g., 31*a* of FIG. 3A) to the haptic controller. In an embodiment, when the electronic device performs an additional operation including the output of the GUI together with providing the haptic feedback, the micro control unit 430 may transmit a touch event (e.g., 32*a*-1 or 32*a*-2 of FIG. 3A) to the processor or the display driving circuit corresponding to whether the user touch corresponds to the touch pattern.

In an embodiment, the micro control unit 430 may determine the haptic pattern corresponding to the pattern of the user touch, and transmit information about the determined haptic pattern to the haptic controller.

In an embodiment, the micro control unit 430 may calculate a distance between a location where a user touch is made and a central location of a specified area, and determine a haptic pattern based on the distance. In an embodiment, the micro control unit 430 may transmit information about the determined haptic pattern to the haptic controller.

In an embodiment, the micro control unit 430 may determine whether the pressure of the touch detected by the pressure sensor 470 is greater than or equal to a specified value. In an embodiment, when the pressure of the user touch is greater than or equal to the specified value, the micro control unit 430 may determine whether the touch corresponds to the specified touch pattern.

The hardware accelerator 440 may complement the computing resources of the micro control unit 430. For example, the hardware accelerator 440 may be implemented to calculate a location (coordinates) of the touch detected by the touch sensor 460 at a high speed.

According to an embodiment, the hardware accelerator 440 may be a hardware implementation of a function for calculating coordinates on the touch sensor 460. The hardware accelerator 440 may calculate the location at which the touch is made more accurately and faster than the micro control unit 430 that executes the software for calculating the coordinates.

The bus 450 may include a circuit that enables data to be transmitted between the touch AFE 410, the memory 420, the micro control unit 430, and the hardware accelerator 440.

Figure 5:
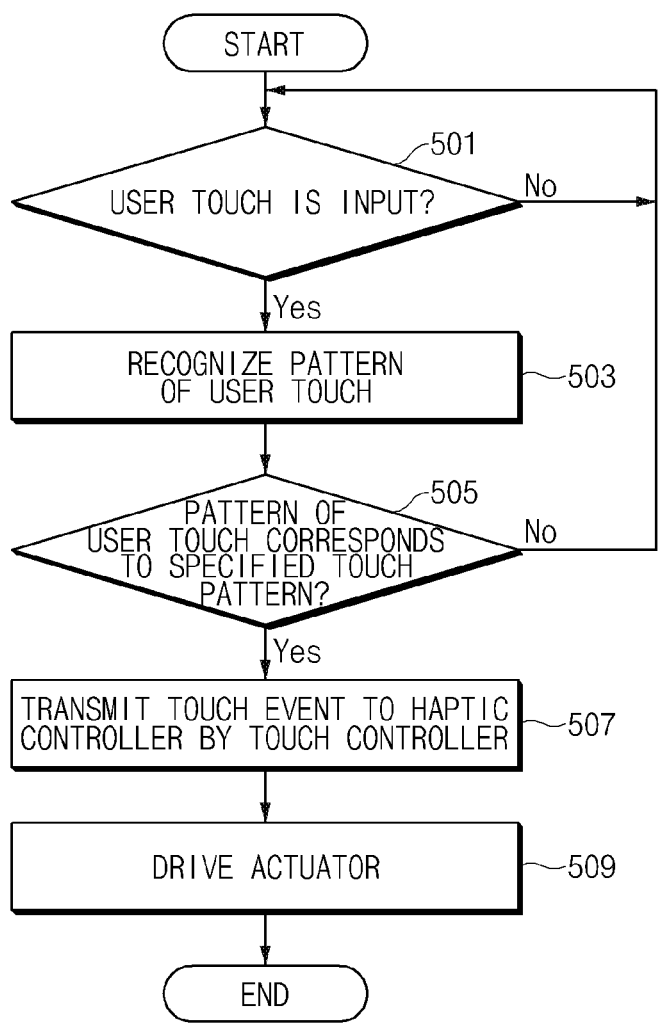
FIG. 5 is a flowchart illustrating a method of providing, by an electronic device, a haptic feedback in response to a touch according to various embodiments.

FIG. 5 is a flowchart illustrating a method of providing, by an electronic device, a haptic feedback in response to a touch of a user according to various embodiments.

Referring to FIG. 5, when a user touch corresponds to a specified touch pattern, the electronic device may provide a haptic feedback to the user.

In operation 501, the touch sensor may sense whether the user touch is input. When the user touch is not input, the touch sensor may continue to sense until the user touch is input. When the touch sensor senses a user touch, the electronic device may perform operation 503.

In operation 503, the touch controller may recognize a touch pattern of a user touch sensed by the touch sensor.

In operation 505, the touch controller may determine whether the user touch corresponds to a specified touch pattern. When the user touch does not correspond to the specified touch pattern, the touch controller may ignore the touch and the touch sensor may sense the user touch again. When the user touch corresponds to the specified touch pattern, the electronic device may perform operation 507.

In operation 507, the touch controller may generate a touch event (e.g., 31a of FIG. 3A) and transmit the generated touch event to the haptic controller.

In operation 509, the haptic controller may provide a haptic feedback to the user by driving the actuator in response to the reception of the touch event.

As described above, the electronic device may provide the haptic feedback to the user.

Figure 6A:
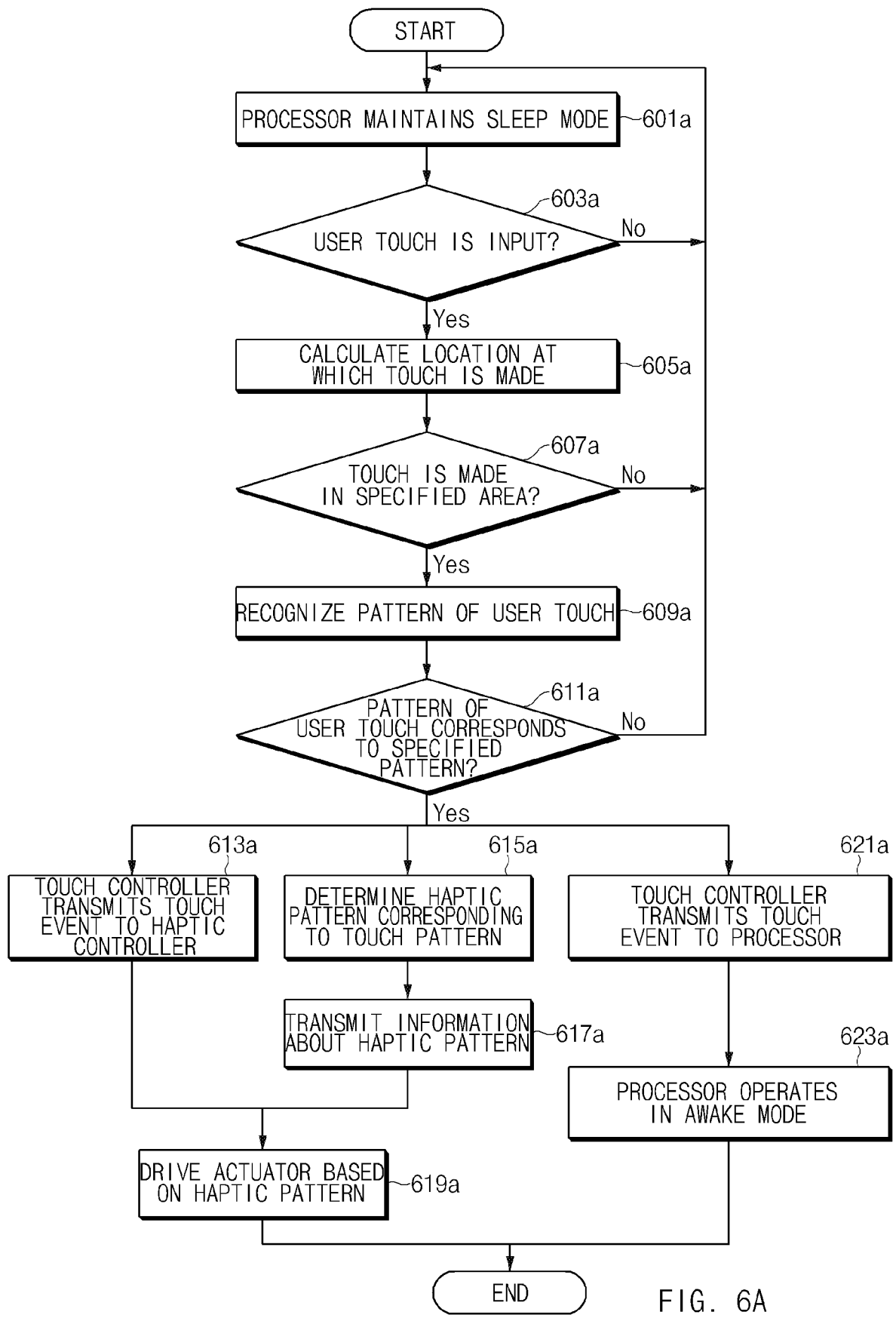
FIG. 6A is a flowchart illustrating a method of providing, by an electronic device, various haptic feedbacks and switching an operation mode of a processor in response to a pattern of a touch according to various embodiments.

FIG. 6A is a flowchart illustrating a method of providing, by an electronic device, various haptic feedbacks and switching an operation mode of a processor in response to a pattern of a touch according to various embodiments.

Referring to FIG. 6A, when a user touch is made in a specified pattern in a specified area, the electronic device may provide various haptic feedbacks to the user and may switch the operation mode of the processor to the awake mode.

In operation 601a, the processor may maintain the operation mode in the sleep mode.

In operation 603a, the touch sensor may sense whether a user touch is input. When the user touch is not input, the touch sensor may continue to sense until the user touch is input, and the processor may maintain the operation mode in the sleep mode. When the touch sensor senses a user touch, the electronic device may perform operation 605a.

In operation 605a, the touch controller may calculate the location at which the user touch is made.

In operation 607a, the touch controller may determine whether the user touch is made in the specified area (e.g., 211a of FIG. 2A). When the user touch is not made in the specified area, the touch controller may ignore the touch, the touch sensor may sense a user touch again, and the processor may maintain the operation mode in the sleep mode. When the user touch is made in the specified area, the electronic device may perform operation 609a.

In operation 609a, the touch controller may recognize the touch pattern of the user touch sensed by the touch sensor.

In operation 611a, the touch controller may determine whether the touch pattern of the user touch corresponds to a specified touch pattern. When the user touch does not correspond to the specified touch pattern, the touch controller may ignore the touch, the touch sensor may sense a user touch again, and the processor may maintain the operation mode in the sleep mode. When the user touch corresponds to the specified touch pattern, the electronic device may perform operations 613, 615 and 621.

In operation 613a, the touch controller may generate a touch event (e.g., 31a of FIG. 3A) with respect to the haptic controller and transmit the generated touch event.

In operation 615a, the touch controller may determine a haptic pattern corresponding to the touch pattern of the user touch.

In operation 617a, the touch controller may transmit information about the determined haptic pattern to the haptic controller.

In operation 619a, the haptic controller may provide a haptic feedback to the user by driving the actuator in response to the reception of the touch event.

In operation 621a, the touch controller may generate a touch event (e.g., 32a-1 of FIG. 3A) and transmit the generated touch event to the processor.

In operation 623a, the processor may switch the operation mode from the sleep mode to the awake mode. By operating in the awake mode, the processor may execute the corresponding application or output the corresponding GUI to the display.

As described above, the electronic device may provide various haptic feedbacks and switch the operation mode of the processor in response to the touch pattern of the user touch.

Figure 6B:
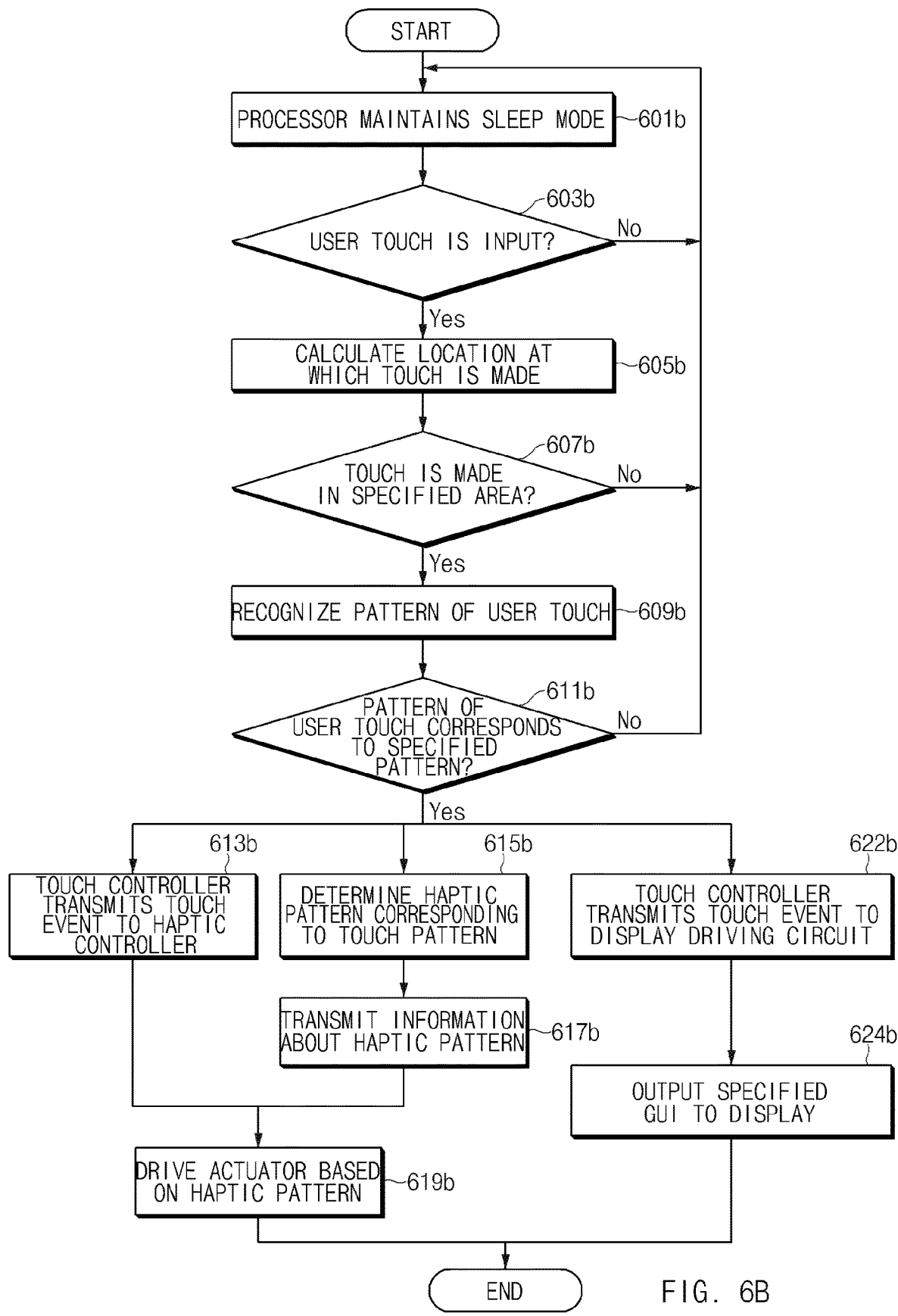
FIG. 6B is a flowchart illustrating a method of providing, by an electronic device, various haptic feedbacks and outputting a specified GUI to a display in response to a pattern of a touch according to various embodiments.

FIG. 6B is a flowchart illustrating a method of providing, by an electronic device, various haptic feedbacks and outputting a specified GUI to a display in response to a pattern of a touch according to various embodiments.

Referring to FIG. 6B, when a user touch is made in a specified pattern in a specified area, the electronic device may provide various haptic feedbacks to the user and may output the specified GUI while maintaining the operation mode of the processor in the sleep mode In operations of FIG. 6B, operations 601b to 619b may correspond to operations 601a to 619a of FIG. 6A.

In operation 622b, the touch controller may generate a touch event (e.g., 32a-2 of FIG. 3A) and transmit the generated touch event to the display driving circuit.

In operation 624b, the display driving circuit may output a specified GUI corresponding to the corresponding touch pattern to the display. In this case, the processor may keep the operation mode in the sleep mode.

As described above, the electronic device may provide various haptic feedbacks in response to a touch pattern of a user and output the specified GUI to the display while maintaining the operation mode of the processor in the sleep mode.

Figure 7:
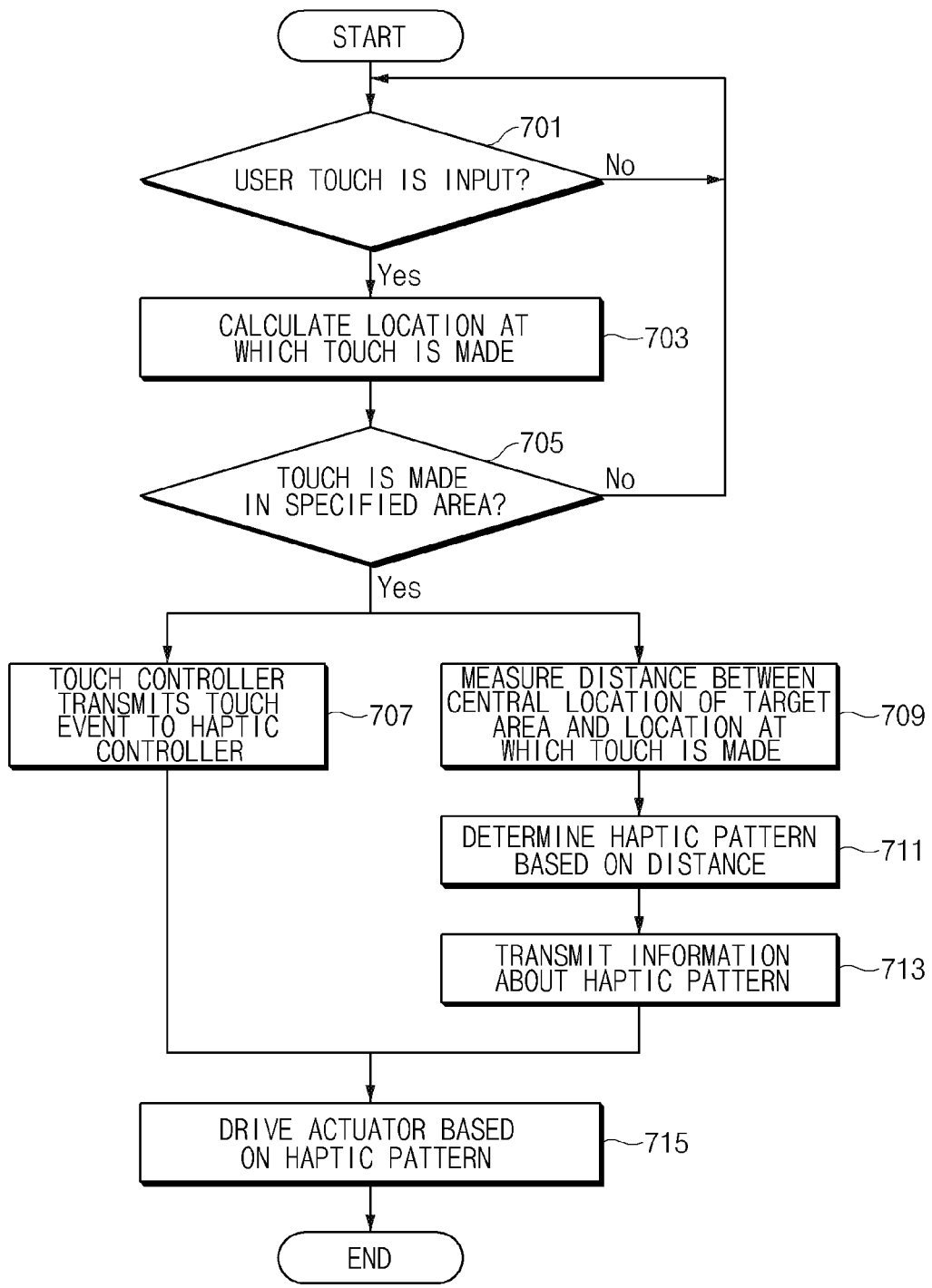
FIG. 7 is a flowchart illustrating a method of providing, by an electronic device, various haptic feedbacks based on a location where a touch is made according to various embodiments.

FIG. 7 is a flowchart illustrating a method of providing, by an electronic device, various haptic feedbacks based on a location where a touch is made according to various embodiments.

Referring to FIG. 7, when a touch of a user is made in a specified area, the electronic device may provide various haptic feedbacks based on the distance between the location at which the touch is made and a target area.

The target area may exist in the specified area and correspond to an area where a specific operation is performed in response to a touch made by a user. For example, the specific operation may be an operation corresponding to pressing a home button in an electronic device having a physical home button.

In operation 701, the touch sensor may sense whether the user touch is input. When the user touch is not input, the touch sensor may continue to sense until the user touch is input. When the touch sensor senses the user touch, the electronic device may perform operation 703.

In operation 703, the touch controller may calculate a location where a user touch is made.

In operation 705, the touch controller may determine whether the user touch is made in the specified area (e.g., 211a of FIG. 2A). When the user touch is not made in the specified area, the touch controller may ignore the touch, the touch sensor may sense the user touch again, and the processor may keep the operation mode in the sleep mode. When the user touch is made in the specified area, the electronic device may perform operations 707 and 709.

In operation 707, the touch controller may generate a touch event (e.g., 31a of FIG. 3A) and transmit the generated touch event to the haptic controller.

In operation 709, the touch controller may measure the distance between the central location of the target area inside the specified area and the location at which the touch is made.

In operation 711, the touch controller may determine the haptic pattern based on the measured distance.

In operation 713, the touch controller may transmit information about the determined haptic pattern to the haptic controller.

In operation 715, the haptic controller may provide a haptic feedback to the user by driving the actuator in response to the reception of the touch event.

As described above, the electronic device may provide various haptic feedbacks based on the location where the user touch is made.

FIG. 8 is a view illustrating a method of providing, by an electronic device, an immediate haptic feedback according to various embodiments.

Referring to FIG. 8, the main display 810a and the sub display 820a of an electronic device 801a may be turned on/off corresponding to the operation mode of a processor. According to an embodiment, when the processor operates in the sleep mode, the main display 810a and the sub display 820a may be turned off. According to an embodiment, when the processor operates in the sleep mode, some pixels included in the main display 810a may be partially turned off, and some of the other pixels may be turned on to implement the AOD. For example, some of the other pixels may be turned on to represent a digital clock.

According to an embodiment, when the processor is in the sleep mode, the sub display 820a may be a specified area (e.g., 211b of FIG. 2B) capable of recognizing a touch. According to an embodiment, when the user touches the sub display 820a which is the specified area and a user touch 8a corresponds to a specified touch pattern 830a, the electronic device 801a may provide an immediate haptic feedback 840a. According to an embodiment, even while the processor maintains the operation mode in the sleep mode, the electronic device 801a may provide the immediate haptic feedback 840a.

According to an embodiment, in the electronic device 801a, when the user touch 8a corresponds to the specified touch pattern 830a, the processor operating in the sleep mode may switch the operation mode to the awake mode in response to an interrupt signal.

According to an embodiment, in an electronic device 801b, when the operation mode of the processor switches to the awake mode, the processor may output a specified GUI corresponding to the user touch 8a to the display. According to an embodiment, the GUI may be output into a specified area of the entire display area. The specified area may include, for example, a location where the user touch 8a is made. For example, the GUI may be output to a sub display 820b which is distinguished from a main display 810b and in which the user touch 8a is made. In this case, the main display 810a may be turned off or only some pixels may be kept to be turned on partially to implement the AOD.

Figure 9:
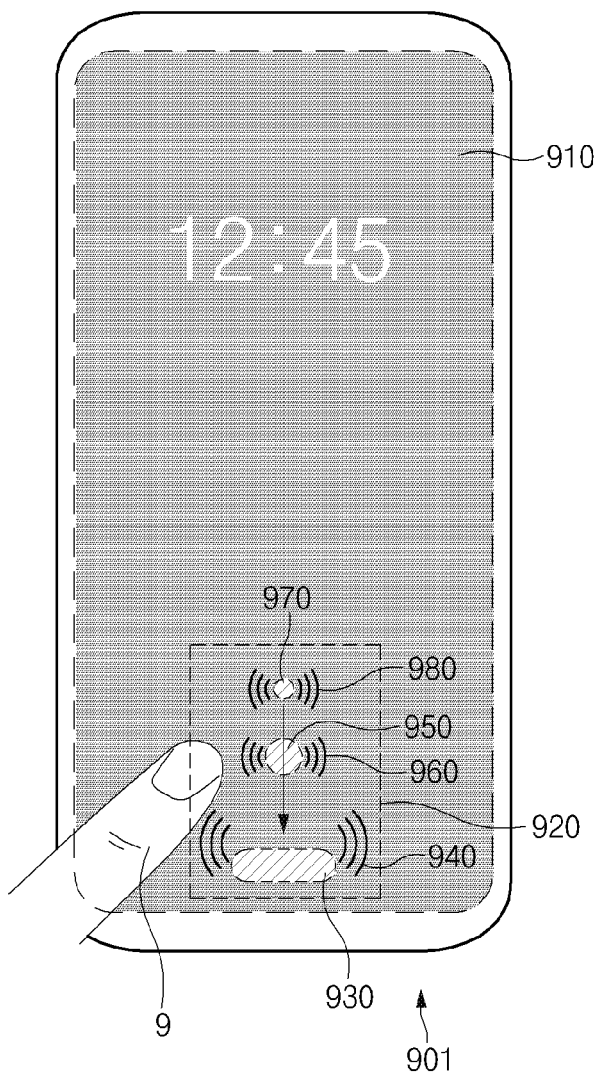
FIG. 9 is a view illustrating a method of providing, by an electronic device, various haptic feedbacks based on a location where a touch is made according to various embodiments.

FIG. 9 is a view illustrating a method of providing, by an electronic device, various haptic feedbacks based on a location where a touch is made according to various embodiments.

Referring to FIG. 9, in an electronic device 901, a display 910 may be turned on/off corresponding to an operation mode of a processor. According to various embodiments, when the processor operates in the sleep mode, the display 910 may be turned off. According to an embodiment, some of the pixels included in the display 910 may be partially turned off, and some of the other pixels may be turned on to implement the AOD. For example, some of the other pixels may be turned on to represent a digital clock. When the processor is in the sleep mode, the display 910 may include a specified area 920 that can recognize a user touch 9.

In an embodiment, the specified area 920 may be all or part of the area of the display 910. In an embodiment, the specified area 920 may include a target area 930. In an embodiment, the target area 930 may correspond to an area where a specific operation is performed when a touch is made. For example, the specific operation may correspond to an operation corresponding to a physical home button. In various embodiments, the target area 930 may be all or part of the specified area 920.

In an embodiment, the electronic device 901 may be set to provide an immediate haptic feedback 940 when the user touch 9 is made in the target area 930, and may be set not to provide a haptic feedback when the user touch 9 may be made outside the target area 930.

According to an embodiment, when the user touch 9 is made in the specified area 920, the electronic device 901 may be set to provide a haptic feedback differently based on the distance between the location at which the touch is made and the central location of the target area 930. For example, the electronic device 901 may provide a first haptic feedback 960 when the user touch 9 is made at a first location 950 and provide a second haptic feedback 980 when the user touch 9 is made at a second location 970. In various embodiments, the haptic feedback 960 at the first location 950 closer to the target area 930 may be set to have a stronger intensity than the haptic feedback 980 at the second location 970.

Figure 10:
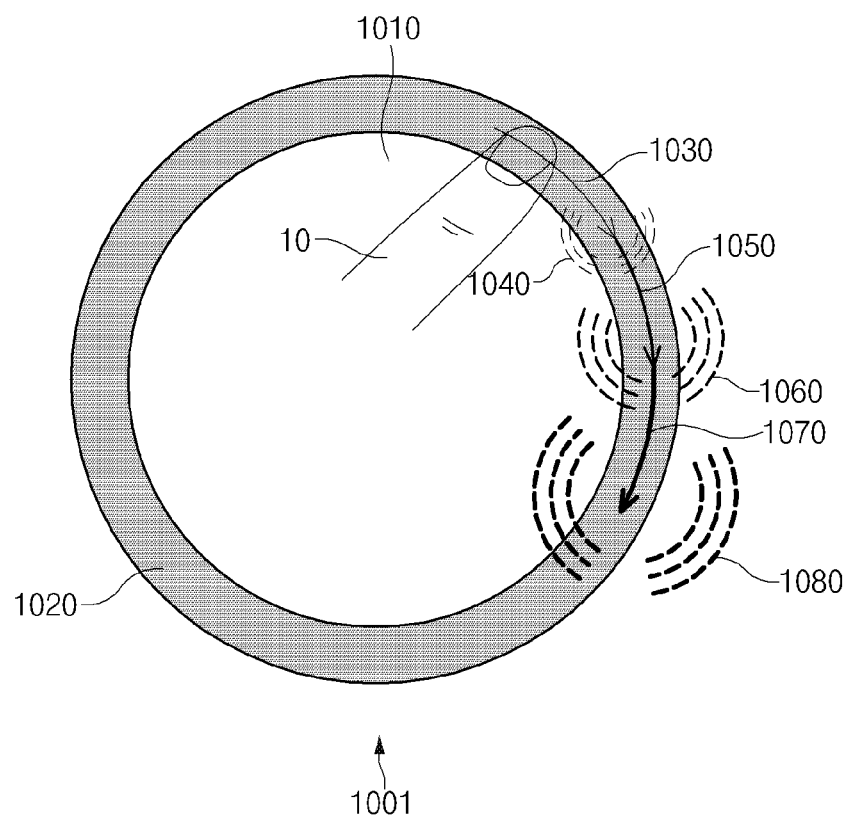
FIG. 10 is a view illustrating a method of implementing an immediate haptic feedback by a wearable electronic device according to various embodiments.

FIG. 10 is a view illustrating a method of implementing an immediate haptic feedback by a wearable electronic device according to various embodiments.

An electronic device 1001, which is a wearable electronic device including a first area 1010 for outputting a screen and a second area 1020 positioned around the first area 1010, may be a smart watch, a smart band, and the like. The first area 1010 may be a display positioned at the center of the electronic device, and the second area 1020 may correspond to a bezel or sub display arranged along the circumference of the first area 1010. In an embodiment, the second area 1020 may correspond to an area capable of recognizing a touch or pressure. In an embodiment, the shape of the first area 1010 may various. For example, the first area 1010 may be in a shape of a circle, an ellipse, a rectangle, or the like.

In an embodiment, the first area 1010 may output an execution screen of an application and provide various information to a user, where the output screen may be switched to another screen by a specified operation. According to various embodiments, when the user touches the second area 1020, the screen of the first area 1010 may be switched to another screen. According to various embodiments, the touch may be a gesture such as a tap, a double tap, a touch move, or the like.

According to an embodiment, the processor for controlling the second area 1020 may operate in a sleep mode. According to various embodiments, when the processor operates in the sleep mode, as a user touch-moves the second area 1020, the electronic device 1001 may provide a haptic feedback to the user.

In an embodiment, the electronic device 1001 may be set to differently provide a haptic feedback based on an angle at which the user touch-moves in the second area 1020. In an embodiment, the electronic device 1001 may provide a first haptic feedback 1040 when a user touch 10 is touch-moved to a first location 1030, and provide a second haptic feedback 1060 when the user touch 10 may be touch-moved to a second location 1050. In addition, when the user touch 10 is touch-moved to a third location 1070, the electronic device 1001 may provide a third haptic feedback 1080. In an embodiment, the strength of the haptic feedback of a longer touch moved may be set to be stronger. For example, the electronic device 1001 may be set such that the second haptic feedback 1060 is stronger than the first haptic feedback 1040 and the third haptic feedback 1080 is stronger than the second haptic feedback 1060.

An electronic device according to various embodiments of the disclosure may provide a haptic feedback to a user by directly transmitting signals to each other without using an application processor in communication between a touch controller and a haptic controller. As a result, the application processor may be kept in a sleep mode and may reduce the number of operations, thereby preventing excessive power consumption of a battery.

An electronic device according to various embodiments of the disclosure may provide a faster response speed when the user touch is made because the signal transmission scheme is simplified compared to the scheme controlled by the application processor.

In the case where the application processor provides the haptic feedback for the user touch while the application processor operates in the sleep mode, because the application processor is required to switch the operation mode prior to the implementation of the haptic feedback after the user touch is sensed, it was difficult to provide the immediate haptic feedback in response to the user touch. According to various embodiments of the disclosure, even when the application processor is kept in a sleep mode, the electronic device may provide the immediate haptic feedback in response to the user touch because direct communication between the touch controller and the haptic controller is possible.

An electronic device according to an embodiment may include a touch sensor that senses a touch, an actuator, a touch controller that generates a touch event based on a touch signal received from the touch sensor, and a haptic controller, where the haptic controller receives the touch event generated from the touch controller through direct communication with the touch controller, and drives the actuator in response to the reception of the touch event.

According to an embodiment, the touch controller and the haptic controller may be included as at least a portion of a single integrated circuit (IC).

According to an embodiment, the electronic device may further include a processor that supports a sleep mode and an awake mode, and the touch controller may transmit the touch event to the processor to allow the processor operating in the sleep mode to switch to the awake mode when a pattern of the touch obtained from the touch signal corresponds to a specified pattern.

According to an embodiment, the electronic device may further include a display coupled to the touch sensor, where the processor may output a specified graphic user interface (GUI) to the display based at least on the touch event received from the touch controller. According to an embodiment, the processor may output the GUI to a specified area including a location at which the touch occurs of an entire area of the display.

According to an embodiment, the touch controller may determine one of a plurality of haptic patterns based on a pattern of the touch obtained from the touch signal. The touch controller may transmit information related to the determined haptic pattern to the haptic controller and the haptic controller may drive the actuator based on the determined haptic pattern based at least on the reception of the touch event.

According to an embodiment, the touch controller may further include a hardware accelerator, and the hardware accelerator may calculate a location at which the touch occurs.

According to an embodiment, the touch controller may determine whether the touch signal corresponds to a specified touch pattern.

According to an embodiment, the touch controller may determine whether the touch signal corresponds to a touch sensed in at least one specified area, and determine one of a plurality of haptic patterns based on whether the touch signal corresponds to a touch occurring in the specified area. According to various embodiments, the touch controller may transmit information related to the determined haptic pattern to the haptic controller, and the haptic controller may drive the actuator based on the determined haptic pattern in response to the reception of the touch event. According to an embodiment, the touch controller may determine one of a plurality of haptic patterns based on a distance between a central location in a specified area and a location at which the touch occurs.

According to an embodiment, the specified touch pattern may include a tap or a double tap, or a gesture of performing a touch move from a first location to a second location.

According to an embodiment, the electronic device may further include a pressure sensor that measures a pressure of the touch, where the touch controller may generate a touch event based on the touch signal when the measured pressure is equal to or greater than a specified value.

According to an embodiment, an electronic device may include a first processor supporting a sleep mode and an awake mode and operating in the sleep mode, a touch sensor configured to sense a touch, a touch controller that is electrically connected to the touch sensor and includes a second processor, an actuator, and a haptic controller that drives the actuator, where the second processor is set to transmit an touch event to the haptic controller based on a touch signal received from the touch sensor, the haptic controller is set to drive the actuator in response to the reception of the touch event, the second processor is set to transmit the touch event to the first processor to allow the first processor to operate in the awake mode.

Various embodiments of the disclosure and terms used herein are not intended to limit the technologies described in the disclosure to specific embodiments, and it should be understood that the embodiments and the terms include modification, equivalent, and/or alternative on the corresponding embodiments described herein. With regard to description of drawings, similar components may be marked by similar reference numerals. The terms of a singular form may include plural forms unless otherwise specified. In the disclosure disclosed herein, the expressions "A or B", "at least one of A and/or B", "A, B, or C", or "at least one of A, B, and/or C", and the like used herein may include any and all combinations of one or more of the associated listed items. Expressions such as "first," or "second," and the like, may express their components regardless of their priority or importance and may be used to distinguish one component from another component but is not limited to these components. When an (e.g., first) component is referred to as being "(operatively or communicatively) coupled with/to" or "connected to" another (e.g., second) component, it may be directly coupled with/to or connected to the other component or an intervening component (e.g., a third component) may be present.

According to the situation, the expression "adapted to or configured to" used herein may be interchangeably used as, for example, the expression "suitable for", "having the capacity to", "changed to", "made to", "capable of" or "designed to" in hardware or software. The expression "a device configured to" may mean that the device is "capable of" operating together with another device or other parts. For example, a "processor configured to (or set to) perform A, B, and C" may mean a dedicated processor (e.g., an embedded processor) for performing corresponding operations or a generic-purpose processor (e.g., a central processing unit (CPU) or an application processor (AP)) which performs corresponding operations by executing one or more software programs which are stored in a memory device (e.g., the memory 130).

The term "module" used herein may include a unit, which is implemented with hardware, software, or firmware, and may be interchangeably used with the terms "logic", "logical block", "part", "circuit", or the like. The "module" may be a minimum unit of an integrated part or a part thereof or may be a minimum unit for performing one or more functions or a part thereof. The "module" may be implemented mechanically or electronically and may include, for example, an application-specific IC (ASIC) chip, a field-programmable gate array (FPGA), and a programmable-logic device for performing some operations, which are known or will be developed.

At least a part of an apparatus (e.g., modules or functions thereof) or a method (e.g., operations) according to various embodiments may be, for example, implemented by instructions stored in a computer-readable storage media (e.g., the memory 130) in the form of a program module. The instruction, when executed by a processor (e.g., the processor 120), may cause the processor to perform a function corresponding to the instruction. The computer-readable recording medium may include a hard disk, a floppy disk, a magnetic media (e.g., a magnetic tape), an optical media (e.g., a compact disc read only memory (CD-ROM) and a digital versatile disc (DVD), a magneto-optical media (e.g., a floptical disk)), an embedded memory, and the like. The one or more instructions may contain a code made by a compiler or a code executable by an interpreter.

Each component (e.g., a module or a program module) according to various embodiments may be composed of single entity or a plurality of entities, a part of the above-described sub-components may be omitted, or other sub-components may be further included. Alternatively or additionally, after being integrated in one entity, some components (e.g., a module or a program module) may identically or similarly perform the function executed by each corresponding component before integration. According to various embodiments, operations executed by modules, program modules, or other components may be executed by a successive method, a parallel method, a repeated method, or a heuristic method, or at least one part of operations may be executed in different sequences or omitted. Alternatively, other operations may be added.

What is claimed is:

1. An electronic device comprising:
   a touch sensor;
   an actuator;
   a touch controller configured to generate a first touch event based on a first touch signal received from the touch sensor;
   a haptic controller; and
   a processor connected to the touch controller and the haptic controller,
   wherein the touch controller is configured to transmit the first touch event to the haptic controller through direct communication with the haptic controller not through the processor, and
   wherein the haptic controller is configured to:
      receive the first touch event, and
      drive the actuator in response to the receiving of the first touch event.

2. The electronic device of claim 1, wherein the touch controller and the haptic controller are included as at least a portion of a single integrated circuit (IC).

3. The electronic device of claim 1, wherein
   the processor is operable in a sleep mode and an awake mode, and
   wherein the touch controller is configured to generate a second touch event based on a second touch signal received from the touch sensor and, based on a pattern of touch obtained from the second touch signal corresponding to a specified pattern, transmit the second touch event to the processor to allow the processor operating in the sleep mode to switch from the sleep mode to the awake mode.

4. The electronic device of claim 3, further comprising: a display coupled to the touch sensor,
wherein the processor is configured to output a specified graphic user interface (GUI) to the display based at least on the second touch event received from the touch controller.

5. The electronic device of claim 4, wherein the processor is configured to output the GUI to a specified area of the display corresponding to a location of the pattern of touch on the touch sensor.

6. The electronic device of claim 1, wherein the touch controller is configured to determine one of a plurality of haptic patterns based on a pattern of touch obtained from the first touch signal and transmit information related to the determined haptic pattern to the haptic controller, and
wherein the haptic controller is configured to drive the actuator based on the determined haptic pattern based at least on the receiving of the first touch event.

7. The electronic device of claim 1, wherein the touch controller further includes a hardware accelerator, and
wherein the hardware accelerator is configured to identify a location at which the touch occurs.

8. The electronic device of claim 1, wherein the touch controller is configured to determine whether a pattern of touch obtained from the first touch signal corresponds to a specified touch pattern.

9. The electronic device of claim 8, wherein the touch controller is configured to:
determine whether the first touch signal corresponds to a-touch sensed in at least one specified area of the touch sensor, and
determine one of a plurality of haptic patterns based on whether the first touch signal corresponds to touch occurring in the specified area,
wherein the first touch event includes information related to the determined haptic pattern and the haptic controller is configured to drive the actuator according to the determined haptic pattern in response to the receiving of the first touch event.

10. The electronic device of claim 8, wherein the touch controller is configured to determine one of a plurality of haptic patterns based on a distance between a central location in a specified area of the touch sensor and a location of the touch sensor at which the touch occurs and the first touch event includes information related to the determined haptic pattern, and
wherein the haptic controller is configured to drive the actuator according to the determined haptic pattern in response to the receiving of the first touch event.

11. The electronic device of claim 8, wherein the specified touch pattern includes a touch gesture from a first location to a second location of the touch sensor.

12. The electronic device of claim 8, wherein the specified touch pattern includes a tap or a double tap.

13. The electronic device of claim 1, further comprising: a pressure sensor configured to measure a touch pressure,
wherein the touch controller is configured to generate the first touch event based on the first touch signal based on the measured pressure being equal to or greater than a specified value.

14. A method of providing a haptic feedback of an electronic device including a touch sensor, a touch controller, a haptic controller, and a processor, the method comprising:
sensing, by the touch sensor, a touch;
generating, by the touch controller, a first touch event based on a first touch signal received from the touch sensor;
transmitting, by the touch controller, the first touch event to the haptic controller through direct communication with the haptic controller not via the processor; and
receiving, by the haptic controller, the first touch event; and
driving an actuator in response to the receiving of the first touch event.

15. The method of claim 14, further comprising:
generating, by the touch controller, a second touch event based on a second touch signal received from the touch sensor; and
based on a pattern of touch obtained from the second signal corresponding to a specified pattern, transmitting, by the touch controller, the second touch event to the processor to allow the processor to switch from a sleep mode to an awake mode.

16. An electronic device comprising:
a touch sensor;
an actuator;
a touch controller;
a haptic controller; and
a processor operable in a sleep mode and an awake mode,
wherein the touch controller is configured to, when the processor operates in the sleep mode:
generate a touch event based on a touch signal received from the touch sensor;
identify a characteristic of a touch on the touch sensor based on the touch signal; and
based on identifying that the characteristic of the identified touch corresponds to a first characteristic, transmit the touch event to the haptic controller via a direct communication so that the processor is not switched from the sleep mode to the awake mode.

17. The electronic device of claim 16, wherein the touch controller is configured to, when the processor operates in the sleep mode, based on identifying that the characteristic of the identified touch corresponds to a second characteristic, transmitting the touch event to the processor so that the processor switches from the sleep mode to the awake mode.

* * * * *